(12) United States Patent
Narahara et al.

(10) Patent No.: US 10,828,966 B2
(45) Date of Patent: Nov. 10, 2020

(54) AIR CONDITIONING DEVICE FOR VEHICLE

(71) Applicant: DENSO CORPORATION, Kariya (JP)

(72) Inventors: Takatomo Narahara, Kariya (JP);
Keisuke Tokorozawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 129 days.

(21) Appl. No.: 15/999,646

(22) PCT Filed: Nov. 23, 2016

(86) PCT No.: PCT/JP2016/084687
§ 371 (c)(1),
(2) Date: Aug. 20, 2018

(87) PCT Pub. No.: WO2017/145468
PCT Pub. Date: Aug. 31, 2017

(65) Prior Publication Data
US 2020/0055376 A1 Feb. 20, 2020

(30) Foreign Application Priority Data

Feb. 22, 2016 (JP) ................. 2016-031365

(51) Int. Cl.
*B60H 1/32* (2006.01)
*B60H 1/00* (2006.01)

(52) U.S. Cl.
CPC ....... *B60H 1/3233* (2013.01); *B60H 1/00564* (2013.01); *B60H 2001/00178* (2013.01)

(58) Field of Classification Search
CPC .............. B60H 1/3233; B60H 1/00564; B60H 2001/00178; B60H 1/00021; B60H 1/00528; B60H 2001/00085
See application file for complete search history.

(56) References Cited

U.S. PATENT DOCUMENTS

2006/0242984 A1* 11/2006 Kang ................. B60H 1/00514
62/285

FOREIGN PATENT DOCUMENTS

| JP | H10278546 A | 10/1998 |
|----|---|---|
| JP | H11170841 A | 6/1999 |
| JP | 2000094946 A | 4/2000 |
| JP | 2004231146 A | 8/2004 |

* cited by examiner

*Primary Examiner* — Ana M Vazquez
(74) *Attorney, Agent, or Firm* — Harness, Dickey & Pierce, P.L.C.

(57) ABSTRACT

A first case member of a blower unit has a first communication passage communicating with an air intake side of a blower. A second case member of a temperature adjustment unit has a second communication passage communicating with a condensed water discharge portion through which condensed water is discharged. The respective case members are joined with each other in a state where a portion forming the first communication passage and a portion forming the second communication passage face each other. The portion of the first communication passage includes a drain portion having a groove shape and configured to discharge water in the first communicating passage. The portion of the second communication passage includes a drain receiving portion having a groove shape, communicating with the first communication passage and receiving the water discharged from the drain portion.

6 Claims, 7 Drawing Sheets

AIR CONDITIONING DEVICE FOR VEHICLE

CROSS REFERENCE TO RELATED APPLICATIONS

This application is a U.S. National Phase Application under 35 U.S.C. 371 of International Application No. PCT/JP2016/084687 filed on Nov. 23, 2016 and published in Japanese as WO/2017/145468 A1 on Aug. 31, 2017. This application is based on and claims the benefit of priority from Japanese Patent Application No. 2016-031365 filed on Feb. 22, 2016. The entire disclosures of all of the above applications are incorporated herein by reference.

TECHNICAL FIELD

The present disclosure relates to an air conditioning device for a vehicle.

BACKGROUND ART

Conventionally, an air conditioning device for a vehicle of an inside/outside air two-layer type has been known, in which an air flow passages are formed upper and lower so that a vehicle exterior air can be guided to the upper air flow passage, and a vehicle interior air can be guided to the lower air flow passage.

The air conditioning device for a vehicle of this type includes a blower unit in which a blower is housed, and a temperature adjustment unit in which a cooling heat exchanger and the like are housed. The air conditioning device for a vehicle has a configuration in which the blower unit and the temperature adjustment unit provided separately are joined with each other.

In this example, water may enter the blower unit from the vehicle exterior due to external factors such as car wash and rain. If the water entering the interior of the blower unit stays inside the blower unit, there is concern that a device housed inside the blower unit may be exposed to the water.

Under the circumstances, a configuration has been known in which the blower unit is provided with a discharge port through which the water is discharged toward the temperature adjustment unit (for example, refer to Patent Literature 1). In Patent Literature 1, a discharge port is provided by inserting an outer circumference of a drain pipe of the blower unit extending in a vehicle width direction into a drain pipe of the temperature adjustment unit extending in the vehicle width direction.

PRIOR ART LITERATURE

Patent Literature

Patent Literature 1: JP 2000-094946 A

SUMMARY

In the air conditioning device for a vehicle, one of the blower unit and the temperature adjustment unit is attached to another unit in some cases, for example, in a state where the one unit is fixed to the vehicle. In this case, since a work space in a vehicle width direction is restricted as compared with a work space in a vehicle front-rear direction of the vehicle, it is preferable to combine the other unit with the one unit in the vehicle front-rear direction.

However, in the configuration in which the discharge port is formed by inserting the outer periphery of the drain pipe of the blower unit into the drain pipe of the temperature adjustment unit as in Patent Literature 1, the drain pipes of the respective units protruding in the vehicle width direction interfere with each other in the vehicle front-rear direction. For that reason, in the configuration of Patent Literature 1, although the drainability of the blower unit can be ensured, ease of combining the respective units is deteriorated.

An object of the present disclosure is to provide an air conditioning device for a vehicle, capable of securing drainability in a blower unit without deteriorating ease of attaching the blower unit and a temperature adjustment unit to each other.

According to an aspect of the present disclosure, an air conditioning device for a vehicle includes a blower unit in which a blower configured to generate an air flow toward a vehicle interior is housed; and a temperature adjustment unit in which a cooling heat exchanger configured to cool an air blown from the blower unit is housed.

The blower unit includes a first case member. The first case member has a first upper passage through which the air flow generated by the blower flows, a first lower passage through which the air flow generated by the blower flows below the first upper passage, and a first communication passage communicating with an air intake side of the blower below the first lower passage.

The temperature adjustment unit includes a second case member. The second case member has a second upper passage communicating with the first upper passage, a second lower passage communicating with the first lower passage below the second upper passage, and a second communication passage located upstream of the cooling heat exchanger and in a lower area of the second lower passage and communicating with a condensed water discharge portion through which a condensed water of the cooling heat exchanger is discharged to the outside.

The first case member and the second case member are joined with each other in a state where a portion forming the first communication passage and a portion forming the second communication passage face each other. The portion of the first communication passage facing the second communication passage includes a drain portion having a groove shape and configured to discharge the water which has entered the first communication passage. Further, the portion of the second communication passage facing the first communication passage includes a drain receiving portion having a groove shape, communicating with the first communication passage and configured to receive the water discharged from the drain portion.

According to the above configuration, the drain portion of the first case member and the drain receiving portion of the second case member each have the groove shapes. Thus, when the first case member and the second case member are combined with each other, the drain portion and the discharge receiving portion do not interfere with each other. Further, since the drain portion of the first case member and the drain receiving portion of the second case member communicate with each other, the water in the blower unit can be discharged toward the temperature adjustment unit.

Therefore, the air conditioning device for a vehicle, capable of securing the drainability in the blower unit without deteriorating ease of attaching the blower unit and the temperature adjustment unit to each other, can be realized.

DESCRIPTION OF EMBODIMENTS

Figure 1:
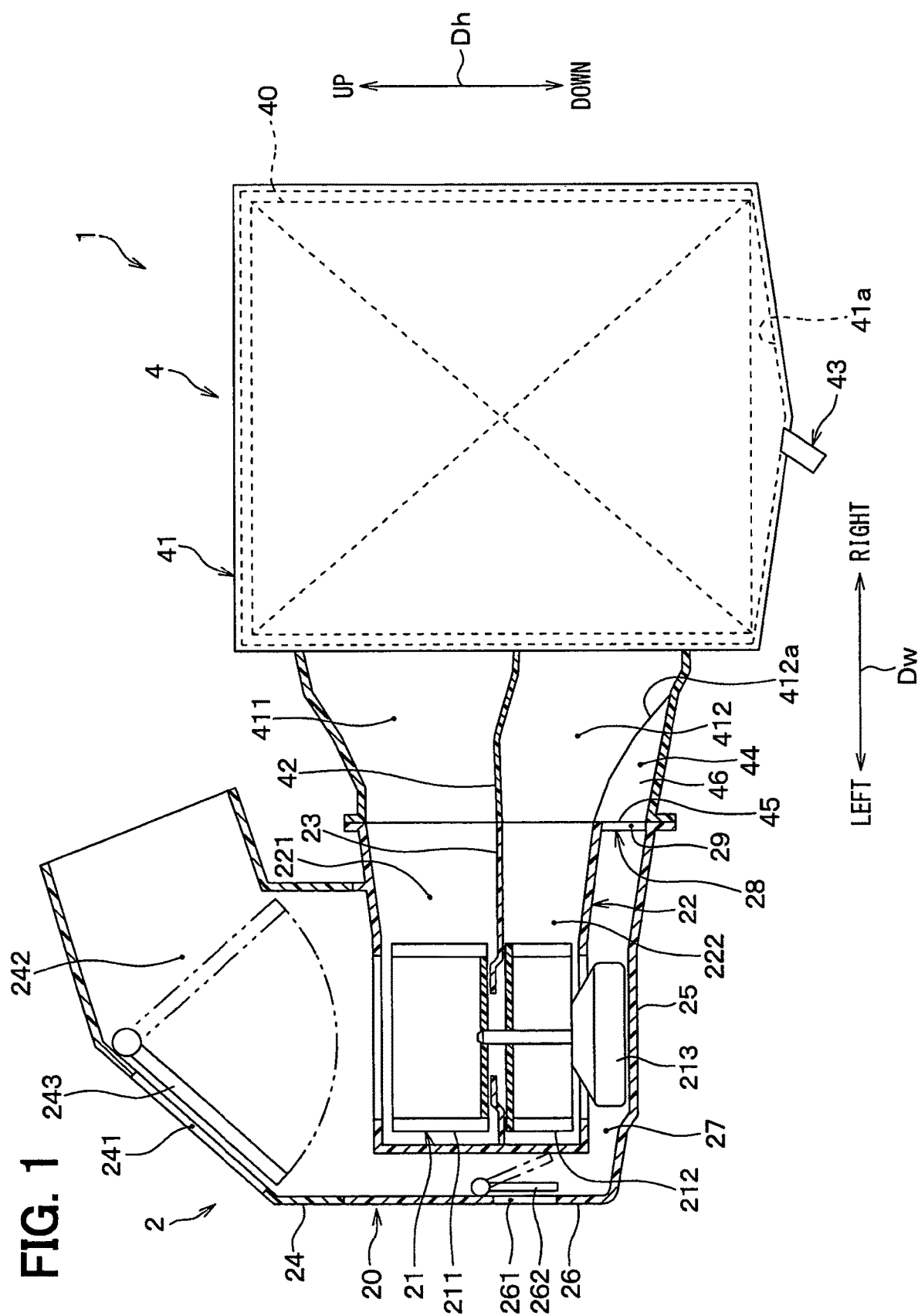
FIG. 1 is a schematic cross-sectional view of an air conditioning device for a vehicle according to a first embodiment.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

The present embodiment will be described with reference to FIGS. 1 to 7. FIG. 1 is a schematic cross-sectional view showing an internal configuration of an interior air conditioning unit 1 for adjusting a temperature and a humidity of an air blown into a vehicle interior in an air conditioning device for a vehicle.

In this example, in FIG. 1, a vertical direction when the air conditioning device for a vehicle is mounted in the vehicle is indicated by an arrow Dh, and right and left in a vehicle width direction are indicated by an arrow Dw. The same is applied to drawings other than FIG. 1. In the vehicle of the present embodiment, it is assumed that a driver's seat is set on the right side and a front passenger seat is set on the left side.

As shown in FIG. 1, the air conditioning device for a vehicle according to the present embodiment is equipped with the interior air conditioning unit 1 of an inside/outside air two-layer system capable of guiding a vehicle exterior air into an upper side air flow passage and guiding a vehicle interior air into a lower side air flow passage. Although not shown, the interior air conditioning unit 1 is disposed inside an instrument panel at a forefront portion of the vehicle.

The interior air conditioning unit 1 is roughly divided into two parts, that is, a blower unit 2 and a temperature adjustment unit 4. A blower 21 for generating an air flow directed toward the vehicle interior is housed in the blower unit 2. In addition, a cooling heat exchanger 40 for cooling the air blown from the blower unit 2, a heating heat exchanger not shown for heating the air that has passed through the cooling heat exchanger 40, and so on are housed in the temperature adjustment unit 4.

First, the blower unit 2 will be described. The blower unit 2 is configured to suction at least one of an inside air and an outside air and blows the suctioned air toward the vehicle interior.

The blower unit 2 is provided with a blower case 20 that houses the blower 21 that generates an air flow heading into the vehicle interior. The blower case 20 has a scroll portion 22 in which an air flow passage is formed in a scroll shape.

An internal space of the scroll portion 22 is partitioned into two passages by a partition plate 23 that is disposed inside and extends in the vehicle width direction Dw. In other words, a first upper passage 221 through which the air flow generated by the blower 21 flows and a first lower passage 222 through which the air flow generated by the blower 21 flows below the first upper passage 221 are provided in the interior of the scroll portion 22.

The blower 21 includes an upper fan 211 that is disposed in the first upper passage 221, a lower fan 212 that is disposed in the first lower passage 222, and an electric motor 213 that rotationally drives the upper fan 211 and the lower fan 212.

The upper fan 211 and the lower fan 212 according to the present embodiment are each configured by a centrifugal multi-blade fan (that is, a sirocco fan). The upper fan 211 and the lower fan 212 are disposed so that axis lines of rotating shafts of the upper fan 211 and the lower fan 212 extend along the vertical direction Dh. A fan (for example, a turbo fan) other than the centrifugal multi-blade fan may be employed for each of the upper fan 211 and the lower fan 212.

The blower 21 according to the present embodiment is configured such that the upper fan 211 suctions the air from the upper side and the lower fan 212 suctions the air from the lower side. Specifically, the upper fan 211 blows the air suctioned from the upper side toward the right side in the vehicle width direction Dh. Further, the lower fan 212 blows the air suctioned from the lower side toward the right side in the vehicle width direction Dh.

The upper fan 211 and the lower fan 212 are rotationally driven by one electric motor 213. The electric motor 213 is disposed on an air intake side of the lower fan 212. The electric motor 213 is attached to an outer wall surface of the scroll portion 22 through a stay not shown.

The blower case 20 also includes a top cover 24 that covers the air intake side of the upper fan 211, a bottom cover 25 that covers the air intake side of the lower fan 212, and a side cover 26 that connects the top cover 24 and the bottom cover 25.

A first inside air introduction port 241 for introducing the inside air into the first upper passage 221 and an outside air introduction port 242 for introducing the outside air into both of the first upper passage 221 and the first lower passage 222 are provided in the top cover 24.

In addition, the top cover 24 is provided with a first inside-outside air switch door 243 for selectively opening and closing the first inside air introduction port 241 and the outside air introduction port 242. The first inside-outside air switch door 243 is driven by a driving unit such as a servomotor not shown.

The bottom cover 25 and the side cover 26 are members that define a blower side communication passage 27 for communicating the outside air introduction port 242 with the air intake side of the lower fan 212 in cooperation with an outer wall of the scroll portion 22. The blower side communication passage 27 is provided to guide the outside air introduced from the outside air introduction port 242 to the air intake side of the lower fan 212.

A second inside air introduction port 261 for introducing the inside air into the first lower passage 222 is provided in the side cover 26. The side cover 26 is provided with a second inside-outside air switch door 262 for selectively opening and closing the second inside air introduction port 261 and the blower side communication passage 27. As with the first inside-outside air switch door 243, the second inside-outside air switch door 262 is driven by a driving unit such as a servomotor not shown.

The bottom cover 25 is provided with a side wall portion 28 having a plate shape at an end of the bottom cover 25 on the side of the temperature adjustment unit 4. The side wall portion 28 covers an opening portion defined by the bottom cover 25 and the scroll portion 22. The detailed structure around the side wall portion 28 will be described later.

In the blower unit 2 configured as described above according to the present embodiment, an entire outside air mode, an entire inside air mode, and an inside/outside air mode can be switched as an air suction mode.

In the entire outside air mode, the first inside-outside air switch door 243 closes the first inside air introduction port 241 and opens the outside air introduction port 242, and the second inside-outside air switch door 262 closes the second inside air introduction port 261 and opens the blower side communication passage 27.

In the entire inside air mode, the first inside-outside air switch door 243 closes the outside air introduction port 242 and opens the first inside air introduction port 241, and the second inside-outside air switch door 262 closes the blower side communication passage 27 and opens the second inside air introduction port 261.

In the inside/outside air mode, the first inside-outside air switch door 243 closes the first inside air introduction port 241 and opens the outside air introduction port 242, and the second inside-outside air switch door 262 closes the blower side communication passage 27 and opens the second inside air introduction port 261.

In the present embodiment, the blower side communication passage 27 configures a first communication passage which communicates with the air intake side of the blower 21 below the first lower passage 222. Further, in the present embodiment, the blower case 20 configures a first case member in which the first upper passage 221, the first lower passage 222, and the blower side communication passage 27 providing the first communication passage are defined.

Next, the temperature adjustment unit 4 will be described. The temperature adjustment unit 4 is configured to adjust the air blown from the blower unit 2 to a desired temperature with the cooling heat exchanger 40 and the heating heat exchanger not shown which are housed inside.

The temperature adjustment unit 4 includes a temperature adjustment case 41 that accommodates the cooling heat exchanger 40, the heating heat exchanger not shown, and the like. The internal space of the temperature adjustment case 41 is partitioned into two passages by a partition plate 42 that is disposed inside and extends in the vehicle width direction Dw.

A second upper passage 411 and a second lower passage 412 are provided in the interior of the temperature adjustment case 41. The second upper passage 411 communicates with the first upper passage 221 of the blower unit 2, and the second lower passage 412 communicates with the first lower passage 222 of the blower unit 2 below the second upper passage 411.

In the temperature adjustment case 41, the cooling heat exchanger 40 is disposed so as to traverse an entire area of the second upper passage 411 and the second lower passage 412. The cooling heat exchanger 40 according to the present embodiment is configured by an evaporator that absorbs a latent heat of vaporization of a refrigerant in a refrigeration cycle not shown from the air flowing through the second upper passage 411 and the second lower passage 412.

A drain pipe 43 for discharging a condensed water condensed by the cooling heat exchanger 40 to the outside of the temperature adjustment case 41 is attached to a bottom wall 41a below the cooling heat exchanger 40 in the temperature adjustment case 41. In the present embodiment, the drain pipe 43 configures a condensed water discharge portion for discharging the condensed water of the cooling heat exchanger 40 to the outside.

In the temperature adjustment case 41, the heating heat exchanger not shown is disposed on the air flow downstream side of the cooling heat exchanger 40. The heating heat exchanger reheats the air cooled by the cooling heat exchanger 40. The heating heat exchanger according to the present embodiment is configured by a heater core that heats the air by radiating a heat from a high-temperature engine coolant water flowing inside.

Although not shown, bypass passages for bypassing the heating heat exchanger are provided on an upper side and a lower side of the heating heat exchanger in the temperature adjustment case 41. In addition, an air mixing door not shown is disposed in the temperature adjustment case 41. The air mixing door is configured to adjust an air volume ratio between a hot air heated by the heating heat exchanger and a cold air flowing through the bypass passage. Furthermore, multiple blowing opening portions not shown are provided in the most downstream portion along the air flow in the temperature adjustment case 41. The multiple blowing opening portions are configured to blow the air adjusted to a desired temperature into an upper side space and a lower side space in the vehicle interior.

In this example, in the temperature adjustment case 41, a temperature adjustment side communication passage 44 that communicates with the drain pipe 43 is provided below the air flow upstream side of the cooling heat exchanger 40 in the second lower passage 412. The temperature adjustment side communication passage 44 is provided to guide the water entering the second lower passage 412 from the first lower passage 222 to the drain pipe 43.

Specifically, in the temperature adjustment case 41, an opposing wall portion 45 that faces the side wall portion 28 of the blower unit 2 is provided at an end portion of the portion providing the temperature adjustment side communication passage 44 of the blower unit 2. The temperature adjustment side communication passage 44 is provided in the opposing wall portion 45. In the present embodiment, the blower side communication passage 27 of the blower case 20 and the temperature adjustment side communication passage 44 of the temperature adjustment case 41 face each other through the side wall portion 28 and the opposing wall portion 45 of the blower case 20.

The temperature adjustment unit 4 configured as described above according to the present embodiment can adjust the air blown from the blower unit 2 to a desired temperature by the cooling heat exchanger 40 and the heating heat exchanger, and supply the air adjusted in temperature to the upper side space and the lower side space in the vehicle interior.

In particular, since the temperature adjustment unit 4 according to the present embodiment is provided with the upper and lower independent air flow passages, the temperature adjustment unit 4 can supply the air obtained by adjusting the temperature of the inside air to the lower side space in the vehicle interior and supply the air obtained by adjusting the temperature of the outside air having a low humidity to the upper side space in the vehicle interior, for example, in the inside/outside air mode.

Incidentally, in the interior air conditioning unit 1 according to the present embodiment, at the time of assembling the vehicle, in a state where one of the blower unit 2 and the temperature adjustment unit 4 is fixed to a structure of the vehicle not shown, the other unit is assembled with one unit.

Specifically, when the vehicle is assembled, the blower case 20 and the temperature adjustment case 41 are assembled with each other so that the first upper passage 221 and the second upper passage 411 communicate with each other, and the first lower passage 222 and the second lower passage 412 communicate with each other. At that time, the blower case 20 and the temperature adjustment case 41 are assembled with each other in a state where the blower side communication passage 27 and the temperature adjustment side communication passage 44 face each other.

In the blower case 20 and the temperature adjustment case 41 according to the present embodiment, a downstream opening end portion 30 of the blower case 20, which will be described later, and an upstream opening end portion 50 of the temperature adjustment case 41, which will be described later, are hermetically sealed with a sealing member 53 which will be described later.

Incidentally, when the blower unit 2 and the temperature adjustment unit 4 are assembled with each other in the vehicle, a work space in the vehicle width direction Dw is remarkably limited as compared with a work space in the vehicle front-rear direction. For that reason, it is desirable to assemble the blower unit 2 and the temperature adjustment unit 4 from the vehicle front-rear direction. The vehicle front-rear direction is a direction perpendicular to a plane of the paper in FIG. 1.

Figure 2:
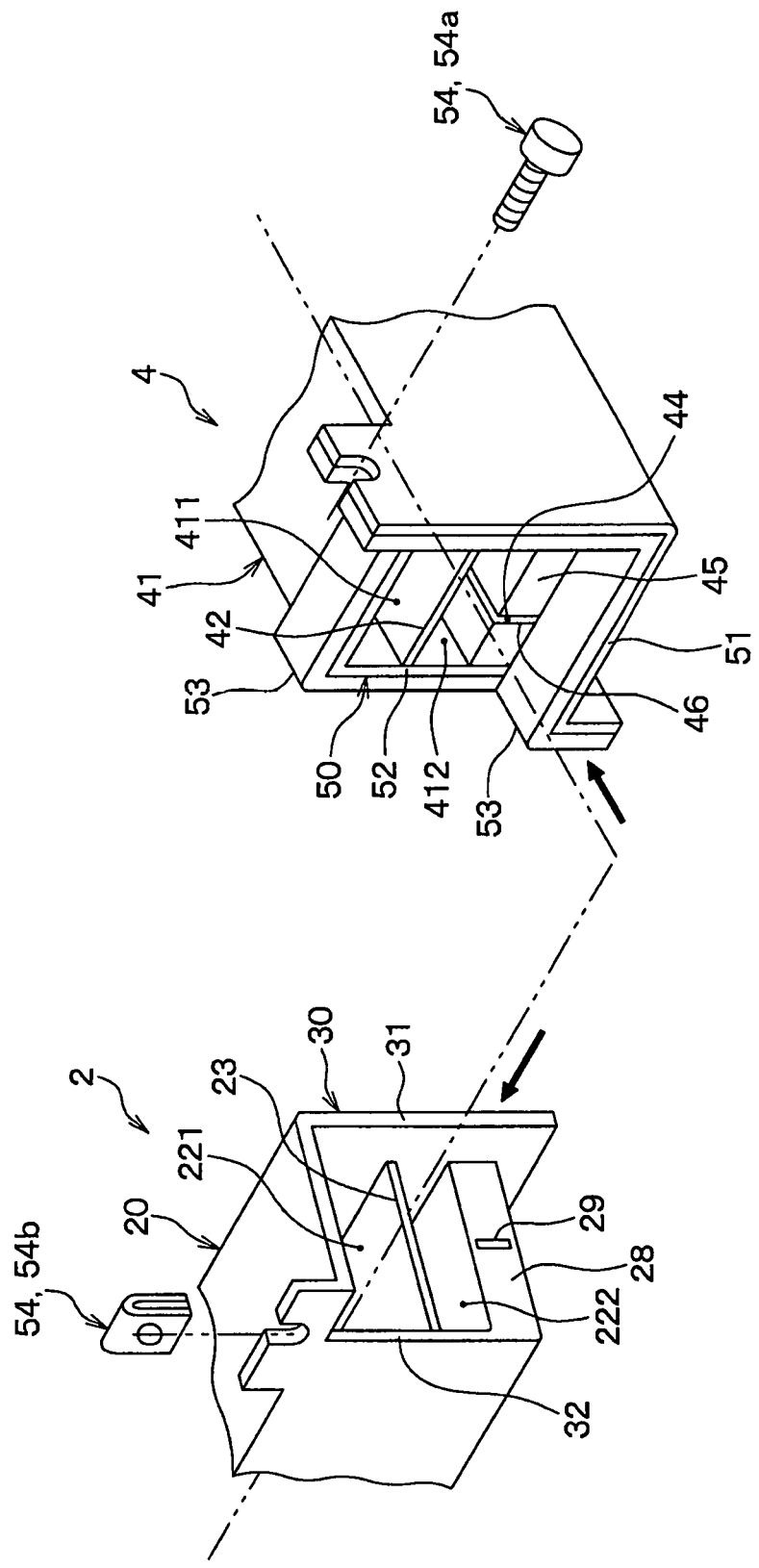
FIG. 2 is an exploded perspective view of a main portion of the air conditioning device for a vehicle according to the first embodiment.

Therefore, the interior air conditioning unit 1 according to the present embodiment is configured by an L-shaped fitting structure in which the blower unit 2 and the temperature adjustment unit 4 can be assembled with each other in the vehicle front-rear direction. Hereinafter, the above structure will be described with reference to FIG. 2. FIG. 2 is an exploded perspective view showing the vicinity of the downstream opening end portion 30 on the air flow downstream side of the blower case 20 in the interior air conditioning unit 1 and the vicinity of the upstream opening end portion 50 on the air flow upstream side of the temperature adjustment case 41.

As shown in FIG. 2, in the blower case 20, a first protrusion portion 31 that protrudes toward the air flow downstream side is formed in one portion of the downstream opening end portion 30, and a first recess portion 32 that is recessed toward the air flow upstream side is defined in a remaining portion of the downstream opening end portion 30.

The first protrusion portion 31 and the first recess portion 32 according to the present embodiment are shaped to be bent in an L-shape. The first protrusion portion 31 and the first recess portion 32 are formed integrally with the downstream opening end portion 30 of the blower case 20.

A second protrusion portion 51 that protrudes toward the air flow upstream side is formed at one portion of the upstream opening end portion 50 in the temperature adjustment case 41, and a second recess portion 52 that is recessed toward the air flow downstream side is provided at a remaining portion of the upstream opening end portion 50.

The second protrusion portion 51 and the second recess portion 52 according to the present embodiment are shaped to be bent in an L shape. The second protrusion portion 51 and the second recess portion 52 are formed integrally with the upstream opening end portion 50 of the temperature adjustment case 41.

In the present embodiment, the sealing member 53 is disposed on an inner wall portion of the second protrusion portion 51 and an outer wall portion of the second recess portion 52 so as to surround an opening edge of the upstream opening end portion 50. The sealing member 53 may be disposed on an inner wall portion of the first protrusion portion 31 and an outer wall portion of the first recess portion 32 so as to surround an opening edge of the downstream opening end portion 30, for example.

An outer wall portion of the first protrusion portion 31 according to the present embodiment is shaped along an inner wall of the second recess portion 52 so as to be fitted on the inner wall portion of the second recess portion 52 through the sealing member 53. An outer wall portion of the second protrusion portion 51 is shaped along an inner wall portion of the first recess portion 32 so as to be fitted on the inner wall of the first recess portion 32 through the sealing member 53.

The blower case 20 and the temperature adjustment case 41 according to the present embodiment are fitted to each other in a state where the sealing member 53 is interposed between the first protrusion portion 31 and the second recess portion 52 and between the first recess portion 32 and the second protrusion portion 51. The blower case 20 and the temperature adjustment case 41 are coupled integrally with each other by a fastening member 54 such as a bolt 54a and a nut 54b in a state in which the downstream opening end portion 30 and the upstream opening end portion 50 are fitted to each other.

As described above, the interior air conditioning unit 1 according to the present embodiment is structured such that a wall portion of the downstream opening end portion 30 of the blower case 20 and a wall portion of the upstream opening end portion 50 of the temperature adjustment case 41 are fitted to each other.

According to the above configuration, for example, even if one unit of the blower unit 2 and the temperature adjustment unit 4 is fixed to the vehicle, the other unit can be assembled from the vehicle front-rear direction.

Further, in the present embodiment, when the blower case 20 and the temperature adjustment case 41 are assembled with each other, the sealing member 53 is crimped between the first protrusion portion 31 and the second recess portion 52 and between the first recess portion 32 and the second protrusion portion 51 in the downstream opening end portion 30 and the upstream opening end portion 50. For that reason, the blower case 20 and the temperature adjustment case 41 are structured to prevent from leaking air or leaking water from a fitting portion between the downstream opening end portion 30 of the blower case 20 and the upstream opening end portion 50 of the temperature adjustment case 41.

Incidentally, when the blower unit 2 is set to the entire outside air mode or the inside/outside air mode, water may enter the interior of the blower case 20 from the outside air introduction port 242 in some cases. The water that has entered the interior of the blower case 20 is accumulated in the blower side communication passage 27 provided on the lower side of the blower case 20.

Therefore, in the present embodiment, a drain portion 29 for discharging the water entering the blower side communication passage 27 is formed at a portion of the blower side communication passage 27 facing the temperature adjustment side communication passage 44. Further, in the present embodiment, a drain receiving portion 46 is provided at a portion of the temperature adjustment side communication passage 44 facing the blower side communication passage 27. The drain receiving portion 46 communicates with the blower side communication passage 27 and receives the water discharged from the drain portion 29. The drain portion 29 and the drain receiving portion 46 are formed in a groove shape so as not to interfere with each other when the blower case 20 and the temperature adjustment case 41 are assembled with each other.

Figure 3:
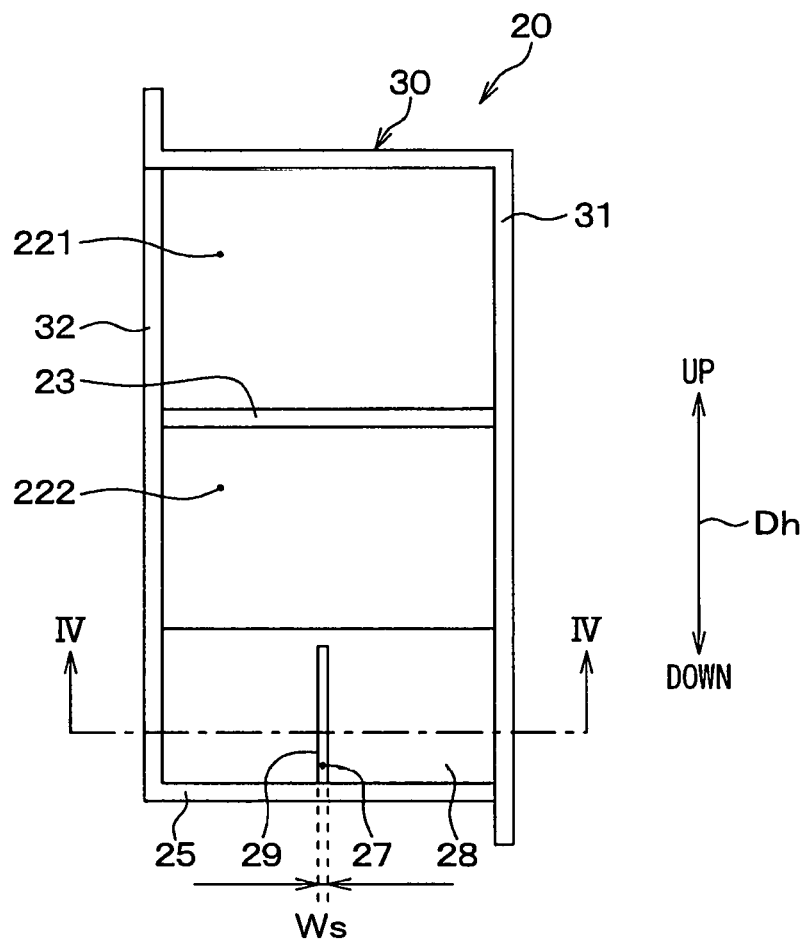
FIG. 3 is a schematic front view of a downstream opening end portion of a blower unit according to the first embodiment.
Figure 4:
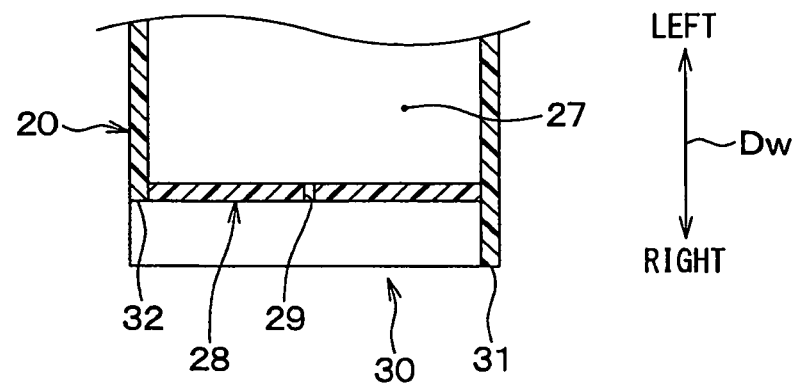
FIG. 4 is a cross-sectional view taken along a line IV-IV in FIG. 3.

Specifically, as shown in FIGS. 3 and 4, the drain portion 29 is configured by a slit-like groove provided in the plate-shaped side wall portion 28 which faces the opposing wall portion 45 providing the temperature adjustment side communication passage 44. The drain portion 29 according to the present embodiment extends from a bottom wall portion of the first lower passage 222 to the bottom cover 25. It is to be noted that the bottom cover 25 is inclined downward toward the drain portion 29 so that water easily gathers in the drain portion 29.

Figure 5:
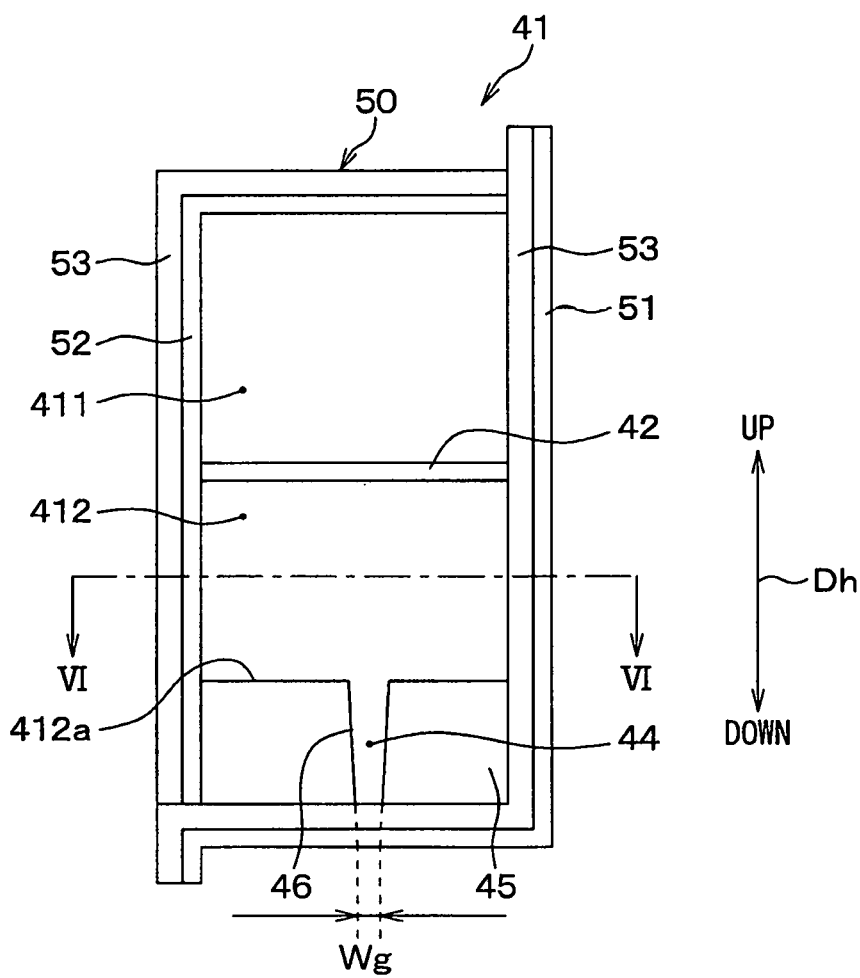
FIG. 5 is a schematic front view of an upstream opening end portion of a temperature adjustment unit according to the first embodiment.
Figure 6:
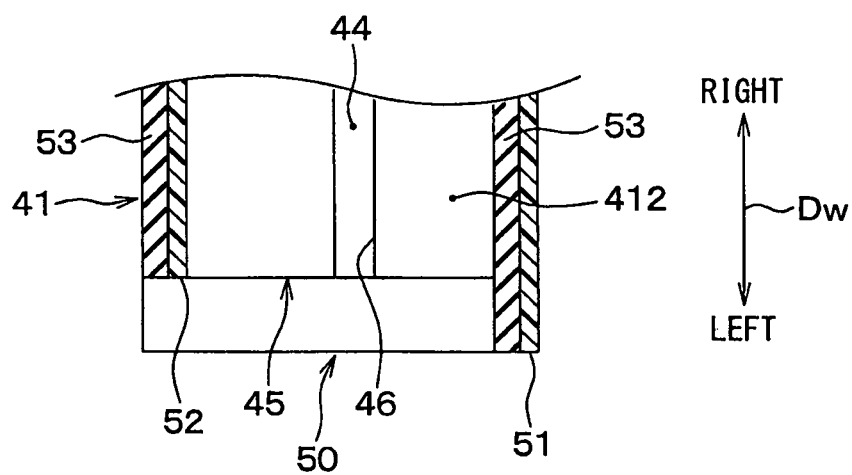
FIG. 6 is a cross-sectional view taken along a line VI-VI in FIG. 5.

Further, as shown in FIGS. 5 and 6, the drain receiving portion 46 is configured by a drain groove provided in the opposing wall portion 45 which faces the side wall portion 28 providing the blower side communication passage 27. The drain receiving portion 46 is formed at a position facing the drain portion 29 in the opposing wall portion 45. The drain receiving portion 46 according to the present embodiment is recessed downward from a bottom wall portion 412a of the second lower passage 412 so as to communicate with the second lower passage 412 and extends along the air flow of the second lower passage 412. The drain receiving portion 46 is inclined downward toward the drain pipe 43 so that the water from the drain portion 29 easily flows toward the drain pipe 43.

In this example, the blower side communication passage 27 communicates with the air intake side of the blower 21, and when the blower 21 is operated, the blower side communication passage 27 becomes lower in pressure than the temperature adjustment side communication passage 44 through which the air flow generated by the blower 21 flows. For that reason, when the blower side communication passage 27 and the temperature adjustment side communication passage 44 communicate with each other through the drain portion 29 and the drain receiving portion 46, there is a risk that the air flows backward from the temperature adjustment side communication passage 44 to the blower side communication passage 27.

Therefore, in the present embodiment, the drain portion 29 is configured by a slit-shaped groove having a groove width Ws smaller than a groove width Wg of the drain receiving portion 46. This makes it possible to prevent the air from flowing backward from the temperature adjustment side communication passage 44 to the blower side communication passage 27.

In this example, the downstream opening end portion 30 is an opening portion surrounding the first upper passage 221, the first lower passage 222, and the drain portion 29. The upstream opening end portion 50 is an opening portion surrounding the second upper passage 411, the second lower passage 412, and the drain receiving portion 46. The sealing member 53 is disposed so as to surround both of the downstream opening end portion 30 and the upstream opening end portion 50.

For that reason, even if both of the drain portion 29 and the drain receiving portion 46 are formed in the groove shape, the blower case 20 and the temperature adjustment case 41 are structured to prevent from leaking the air or leaking the water from the drain portion 29 and the drain receiving portion 46.

Figure 7:
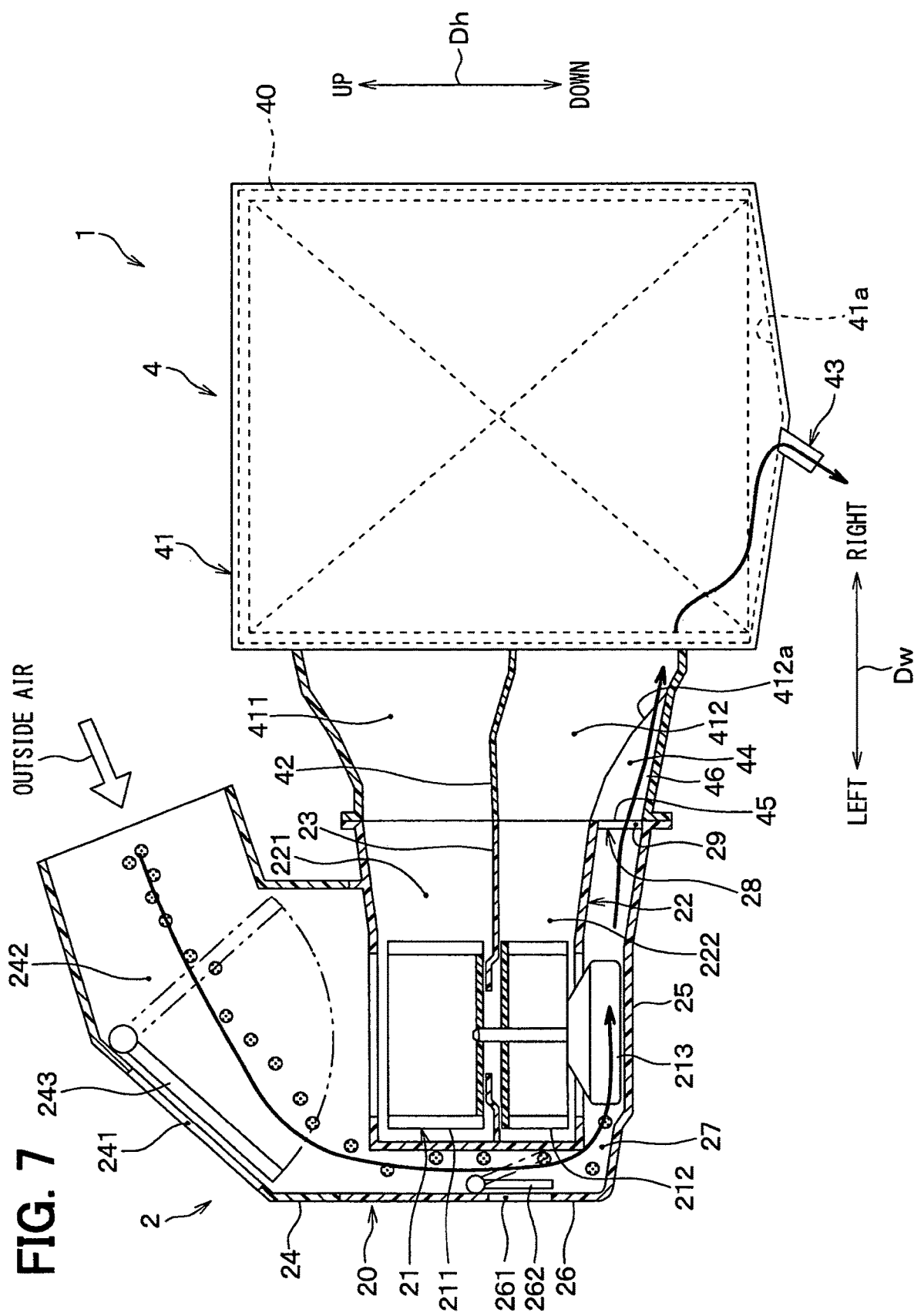
FIG. 7 is a schematic cross-sectional view illustrating a flow of water entering from an outside in the air conditioning device for a vehicle according to the first embodiment.

In the interior air conditioning unit 1 of the air conditioning device for a vehicle described above, the blower side communication passage 27 of the blower unit 2 and the temperature adjustment side communication passage 44 of the temperature adjustment unit 4 communicate with each other through the drain portion 29 and the drain receiving portion 46. For that reason, in the air conditioning device for a vehicle according to the present embodiment, for example, as shown in FIG. 7, even if the water enters the interior of the blower unit 2 in the entire outside air mode, the water in the blower unit 2 can be discharged toward the temperature adjustment unit 4 through the drain portion 29 and the drain receiving portion 46.

Further, in the present embodiment, the drain portion 29 and the drain receiving portion 46 are formed in a groove shape. For that reason, when the blower case 20 and the temperature adjustment case 41 are assembled with each other, the drain portion 29 and the drain receiving portion 46 do not interfere with each other.

Therefore, according to the configuration of the present embodiment, the air conditioning device for a vehicle capable of securing the drainability in the blower unit 2 without inhibiting the assembling performance of the blower unit 2 and the temperature adjustment unit 4 can be realized.

In addition, in the present embodiment, the drain portion 29 is configured by a slit-shaped groove having a groove width smaller than a groove width of the drain receiving portion 46. This makes it possible to prevent the air from flowing backward from the temperature adjustment side communication passage 44 to the blower side communication passage 27. Further, since the groove width of the drain receiving portion 46 is larger than that of the drain portion 29, a communication between the drain portion 29 and the drain receiving portion 46 can be prevented from being interrupted due to an assembly error or the like.

Furthermore, in the present embodiment, the drain receiving portion 46 is provided in the opposing wall portion 45 which configures the bottom wall portion 412a of the second lower passage 412 and faces the portion providing the blower side communication passage 27. In the present embodiment, the drain receiving portion 46 is configured by a drain groove extending downward from the bottom wall portion 412a of the second lower passage 412. According to the above configuration, the water entering the second lower passage 412 from the first lower passage 222 can be guided toward the drain pipe 43 via the drain receiving portion 46. Further, since the drain receiving portion 46 is formed in a groove shape, even if the drain receiving portion 46 and the second lower passage 412 communicate with each other, an influence of the second lower passage 412 on the passage shape can be reduced. In other words, since the drain receiving portion 46 is formed in the groove shape, the passage shape of the second lower passage 412 can be maintained in a shape suitable for air flow.

Furthermore, in the present embodiment, the wall portion of the downstream opening end portion 30 of the blower case 20 and the wall portion of the upstream opening end portion 50 of the temperature adjustment case 41 are fitted to each other through the sealing member 53. For that reason, for example, even in the state where one of the blower unit 2 and the temperature adjustment unit 4 is fixed to the structure of the vehicle, the other unit can be assembled with one unit from the vehicle front-rear direction.

In this example, the sealing member 53 is disposed between the downstream opening end portion 30 of the blower case 20 and the upstream opening end portion 50 of the temperature adjustment case 41. The sealing member 53 surrounds the entire circumference of the downstream opening end portion 30 and the upstream opening end portion 50, For that reason, even if the grooved drain portion 29 and the grooved drain receiving portion 46 are butted against each other to provide a drain path for discharging the water from the blower unit 2 to the temperature adjustment unit 4, the air and water can be prevented from leaking from a fitting portion of the blower case 20 and the temperature adjustment case 41. This is not limited to the L-shaped fitting structure, but the same effects can be obtained even by other fitting structures.

Second Embodiment

Next, a second embodiment will be described with reference to FIGS. 8 and 9. In the present embodiment, an example in which the multiple drain portions 29 are provided in the side wall portion 28 configuring the blower side communication passage 27 and the multiple drain receiving portions 46 are provided in the opposing wall portion 45 configuring the temperature adjustment side communication passage 44 will be described.

Figure 8:
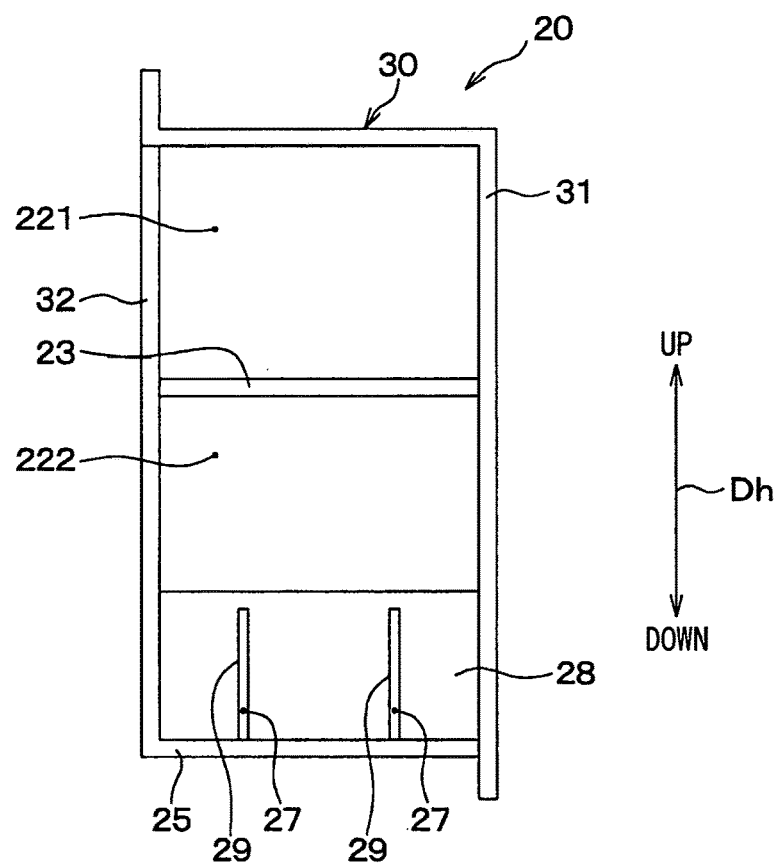
FIG. 8 is a schematic front view of a downstream opening end portion of a blower unit according to a second embodiment.

As shown in FIG. 8, the side wall portion 28 of the present embodiment is provided with the two drain portions 29. The two drain portions 29 are each configured by a slit-like groove that extends from a bottom wall portion of the first lower passage 222 to the bottom cover 25.

Figure 9:
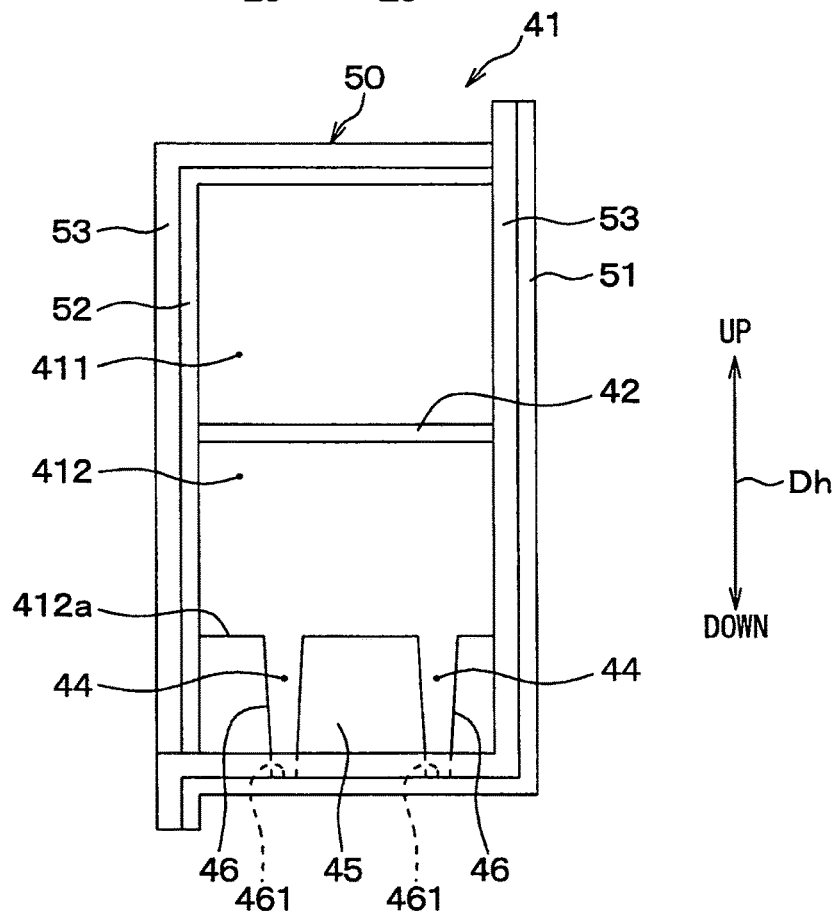
FIG. 9 is a schematic front view of an upstream opening end portion of a temperature adjustment unit according to the second embodiment.

Further, as shown in FIG. 9, the opposing wall portion 45 according to the present embodiment is formed with the two drain receiving portions 46 of the same number as that of the draining portions 29. The two drain portions 29 are formed at positions of the opposing wall portion 45 facing the two drain portion 29.

The other configuration is the same as in the first embodiment. The configuration of the present embodiment includes the same configuration as that of the first embodiment. For that reason, the configuration of the present embodiment can obtain the same advantages as those in the first embodiment, which are obtained from the configuration of the first embodiment.

Furthermore, in the present embodiment, since the two drain portions 29 are provided in the side wall portion 28 and the drain receiving portions 46 of the same number as that of the drain portions 29 are provided in the opposing wall portion 45, a drainability in the blower unit 2 can be improved.

In this example, in the present embodiment, the example in which the two drain portions 29 and the two drain receiving portions 46 are provided has been described, but the present disclosure is not limited to the above example. Three or more drain portions 29 and drain receiving portions 46 may be provided as long as those units are provided in the same number.

Third Embodiment

Next, a third embodiment will be described with reference to FIG. 10. In the present embodiment, a configuration capable of improving a drainability of water entering the second lower passage 412 from the first lower passage 222 will be described.

Figure 10:
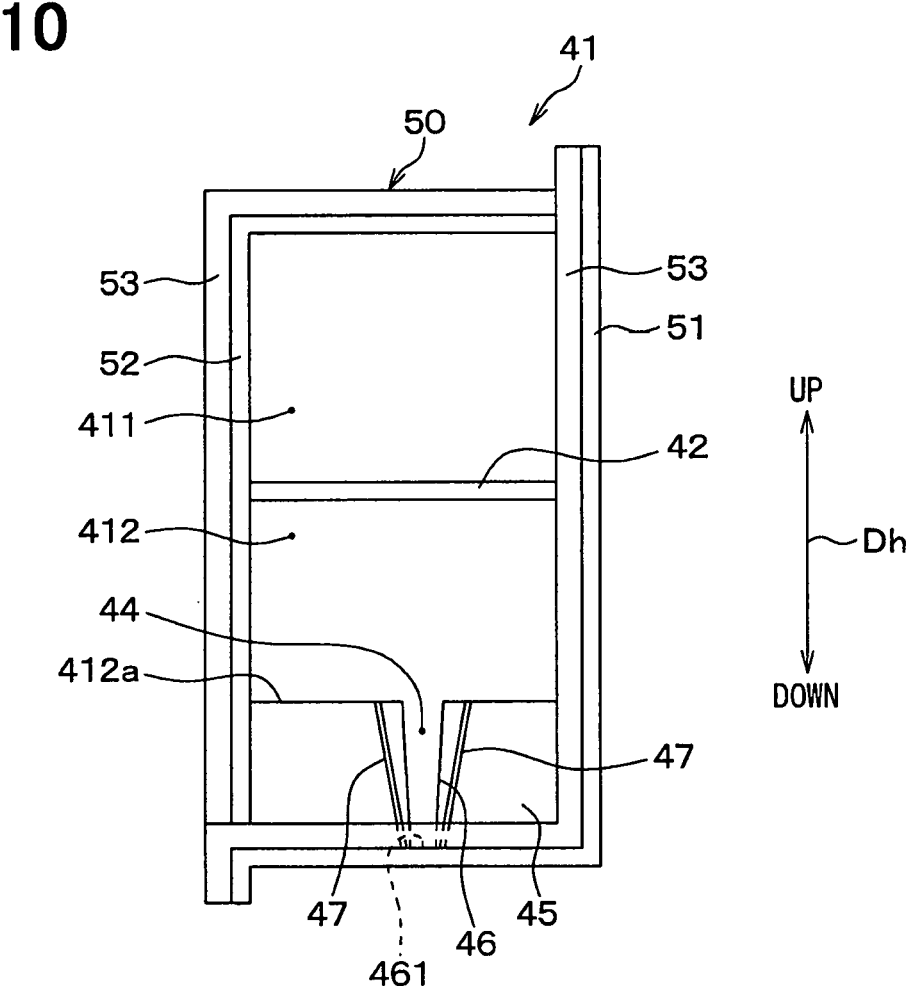
FIG. 10 is a schematic front view of an upstream opening end portion of a temperature adjustment unit according to a third embodiment.

As shown in FIG. 10, the opposing wall portion 45 of the present embodiment is provided with a guide portion 47 that guides the water entering the second lower passage 412 from the first lower passage 222 to a bottom portion 461 of the drain receiving portion 46.

The guide portion 47 according to the present embodiment is configured by a pair of grooves extending downward along the drain receiving portion 46 on both sides of the drain receiving portion 46. The guide portion 47 may be configured by a pair of ribs extending downward along the drain receiving portion 46 on both sides of the drain receiving portion 46.

The other configuration is the same as in the first embodiment. The configuration of the present embodiment includes the same configuration as that of the first embodiment. For that reason, the configuration of the present embodiment can obtain the advantages obtained by the configuration of the first embodiment.

Further, in the present embodiment, the opposing wall portion 45 is provided with the guide portion 47 that guides the water entering the second lower passage 412 from the first lower passage 222 to the bottom portion 461 of the drain receiving portion 46. According to the above configuration, the water that has entered the second lower passage 412 from the first lower passage 222 is likely to gather at the bottom portion 461 of the drain receiving portion 46. For that reason, the water entering the second lower passage 412 from the first lower passage 222 can be properly discharged through the drain receiving portion 46.

Other Embodiments

The typical embodiments disclosed in the present disclosure have been described above. However, the air conditioning device for a vehicle according to the present disclosure is not limited to the embodiments described above, but can be variously modified as below, for example.

In the embodiments described above, the example in which the L-shaped fitting structure is employed in order to assemble the blower unit 2 and the temperature adjustment unit 4 together in the vehicle front-rear direction has been described, but the present disclosure is not limited to the above example. The blower unit 2 and the temperature adjustment unit 4 may be assembled with each other by a structure other than the L-shaped fitting structure so far as the downstream opening end portion 30 of the blower case 20 and the downstream opening end portion 30 of the temperature adjustment case 41 are hermetically sealed with the sealing member 53. In the interior air conditioning unit 1, the blower unit 2 and the temperature adjustment unit 4 may be assembled with each other from not only the vehicle front-rear direction but also the vehicle width direction Dw or the vehicle vertical direction Dh.

As in the embodiments described above, it is preferable to form the drain portion 29 with a slit-shaped groove having the groove width Ws smaller than the groove width Wg of the drain receiving portion 46, but the present disclosure is not limited to the above configuration. For example, the drain portion 29 may be configured by a slit-shaped groove having a groove width larger than the groove width of the drain receiving portion 46.

In the embodiment described above, the drain receiving portion 46 extends downward from the bottom wall portion 412a of the second lower passage 412 so as to communicate with the second lower passage 412 and extends along the air flow of the second lower passage 412. However, the present disclosure is not limited to the above configuration. For example, the drain receiving portion 46 may be configured by a drain groove which does not communicate with the second lower passage 412.

In the respective embodiments described above, elements configuring the embodiments are not necessarily indispensable as a matter of course, except when the elements are particularly specified as indispensable and the elements are considered as obviously indispensable in principle.

In the respective embodiments described above, when numerical values such as the number, figures, quantity, a range of configuration elements in the embodiments are described, the numerical values are not limited to a specific number, except when the elements are particularly specified as indispensable and the numerical values are obviously limited to the specific number in principle.

In the respective embodiments described above, when a shape, and a positional relationship of the configuration elements are described, the configuration elements are not limited to the shape, and the positional relationship, except when the configuration elements are particularly specified and are limited to a specific shape, and positional relationship in principle.

CONCLUSION

According to a first aspect shown in part or all of the embodiments described above, in the air conditioning device for a vehicle, the grooved drain portion for discharging the water entering the first communication passage is provided at a portion of the first communication passage of the first case member facing the second communication passage. In addition, in the air conditioning device for a vehicle, the grooved drain receiving portion that receives the water discharged from the drain portion is provided at a portion of the second communication passage of the second case member facing the first communication passage so as to communicate with the first communication passage.

According to a second aspect, the first case member is provided with the plate-shaped side wall portion facing a portion of the second case member providing the second communication passage. The drain portion is configured by a slit-like groove formed in the side wall portion and having a groove width smaller than the groove width of the drain receiving portion.

In this way, if the drain portion is configured by the slit-shaped groove having a groove width smaller than that of the drain receiving portion, the air can be prevented from flowing backward from the second communication passage to the first communication passage. Further, since the groove width of the drain receiving portion is larger than that of the drain portion, a communication between the drain portion and the drain receiving portion can be prevented from being interrupted due to an assembly error or the like.

According to a third aspect, the second case member is provided with the opposing wall portion that configures the bottom wall portion of the second lower passage, and faces the portion providing the first communication portion. The drain receiving portion is configured by the drain groove provided in the opposing wall portion and extending downward from the bottom wall portion of the second lower passage.

In this way, if the drain receiving portion is configured by the drain groove extending downward from the bottom wall portion of the second lower passage, the water entering the second lower passage from the first lower passage can be discharged to the outside through the drain receiving portion. Further, since the drain receiving portion is formed in a groove shape, even if the drain receiving portion and the second lower passage communicate with each other, an influence of the second lower passage on the passage shape can be reduced. In other words, since the drain receiving portion is formed in the groove shape, the passage shape of the second lower passage can be maintained in a shape suitable for air flow.

In addition, according to a fourth aspect, the opposing wall portion is provided with the guide portion that guides the water entering the second lower passage from the first lower passage to the bottom portion of the drain receiving portion. In this way, if the guide portion that guides the water entering the second lower passage from the first lower passage to the bottom portion of the drain receiving portion is provided in the opposing wall portion, the water entering the second lower passage from the first lower passage is likely to gather at the drain receiving portion. For that reason, the water entering the second lower passage from the first lower passage can be properly discharged through the drain receiving portion.

In addition, according to a fifth aspect, in the first case member, the first protrusion portion that protrudes toward the air flow downstream side is formed at one portion of the downstream opening end portion on the air flow downstream side, and a first recess portion that is recessed toward the air flow upstream side is defined in a remaining portion of the downstream opening end portion. The second protrusion portion that protrudes toward the air flow upstream side is formed at one portion of the upstream opening end portion on the air flow upstream side in the second case member, and the second recess portion that is recessed toward the air flow downstream side is provided at the remaining portion of the upstream opening end portion. The outer wall portion of the first protrusion portion is shaped along the inner wall of the second recess portion so as to be fitted on the inner wall portion of the second recess portion. The outer wall portion of the second protrusion portion is shaped along the inner wall of the first recess portion so as to be fitted on the inner wall portion of the first recess portion. The first case member and the second case member are fitted to each other in a state where the sealing member is interposed between the outer wall portion of the first protrusion portion and the inner wall portion of the second recess portion, and the sealing member is interposed between the outer wall of the first recess portion and the inner wall of the second protrusion portion.

As described above, in the configuration where the wall portion of the downstream side opening end portion of the first case member and the wall portion of the upstream side opening end portion of the second case member are fitted to each other, for example, even in the state where one of the blower unit and the temperature adjustment unit is fixed to the structure of the vehicle, the other unit can be assembled with one unit from the vehicle front-rear direction.

According to a sixth aspect, at least one drain portion is formed in the portion providing the first communication passage. The drain receiving portions of the same number as that of the first communication passage are formed in the portion providing the second communication passage. In this way, the number of drain portions and the number of drain receiving portions may be one or plural.

What is claimed is:

1. An air conditioning device for a vehicle, comprising:
a blower unit in which a blower configured to generate an air flow toward a vehicle interior is housed; and
a temperature adjustment unit in which a cooling heat exchanger configured to cool an air blown from the blower unit is housed, wherein
the blower unit includes a first case member, the first case member having a first upper passage through which the air flow generated by the blower flows, a first lower passage through which the air flow generated by the blower flows below the first upper passage, and a first communication passage communicating with an air intake side of the blower below the first lower passage,
the temperature adjustment unit includes a second case member, the second case member having a second upper passage communicating with the first upper passage, a second lower passage communicating with the first lower passage below the second upper passage, and a second communication passage located upstream of the cooling heat exchanger and in a lower area of the second lower passage and communicating with a condensed water discharge portion through which a condensed water of the cooling heat exchanger is discharged to the outside,
the first case member and the second case member are joined with each other in a state where a portion forming the first communication passage and a portion forming the second communication passage face each other,
the portion of the first communication passage facing the second communication passage includes a drain portion having a groove shape and configured to discharge the water which has entered the first communication passage, and
the portion of the second communication passage facing the first communication passage includes a drain receiving portion having a groove shape, communicating with the first communication passage and configured to receive the water discharged from the drain portion.

2. The air conditioning device for a vehicle, according to claim 1, wherein
the first case member includes a side wall portion having a plate shape and facing the portion of the second case member forming the second communication passage, and the drain portion is provided in the side wall portion and has a groove having a slit shape with a groove width smaller than a groove width of the drain receiving portion.

3. The air conditioning device for a vehicle, according to claim 1, wherein
the second case member includes an opposing wall portion constituting a bottom wall portion of the second lower passage and facing the portion forming the first communication passage, and
the drain receiving portion is provided in the opposing wall portion and has a drain groove recessed downward from the bottom wall portion of the second lower passage.

4. The air conditioning device for a vehicle, according to claim 3, wherein
the opposing wall portion includes a guide portion that guides the water entering the second lower passage from the first lower passage toward a bottom portion of the drain receiving portion.

5. The air conditioning device for a vehicle, according to claim 1, wherein
the first case member includes a first protrusion portion protruding downstream in the air flow from a portion of a downstream opening end portion on a downstream side of the first case member in the air flow, and a first recess portion recessed upstream in the air flow from a remaining portion of the downstream opening end portion,
the second case member includes a second protrusion portion protruding upstream in the air flow from a portion of an upstream opening end portion on an upstream side of the second case member in the air flow, and a second recess portion recessed downstream in the airflow from a remaining portion of the upstream opening end portion,
an outer wall portion of the first protrusion portion has a shape corresponding to an inner wall portion of the second recess portion to be fitted into the inner wall of the second recess portion,
an outer wall portion of the second protrusion portion has a shape corresponding to an inner wall of the first recess portion to be fitted into the inner wall portion of the first recess portion, and
the first case member and the second case member are fitted to each other in a state where a sealing member is interposed between the outer wall portion of the first protrusion portion and the inner wall portion of the second recess portion, and where the sealing member is interposed between the inner wall portion of the first recess portion and the outer wall portion of the second protrusion portion.

6. The air conditioning device for a vehicle, according to claim 1, wherein
the drain portion in the portion forming the first communication passage is the same in number as the drain receiving portion in the portion forming the second communication passage.

* * * * *